No. 868,583. PATENTED OCT. 15, 1907.
D. SCHUYLER.
CORN AND FRUIT SPOON.
APPLICATION FILED AUG. 24, 1905.

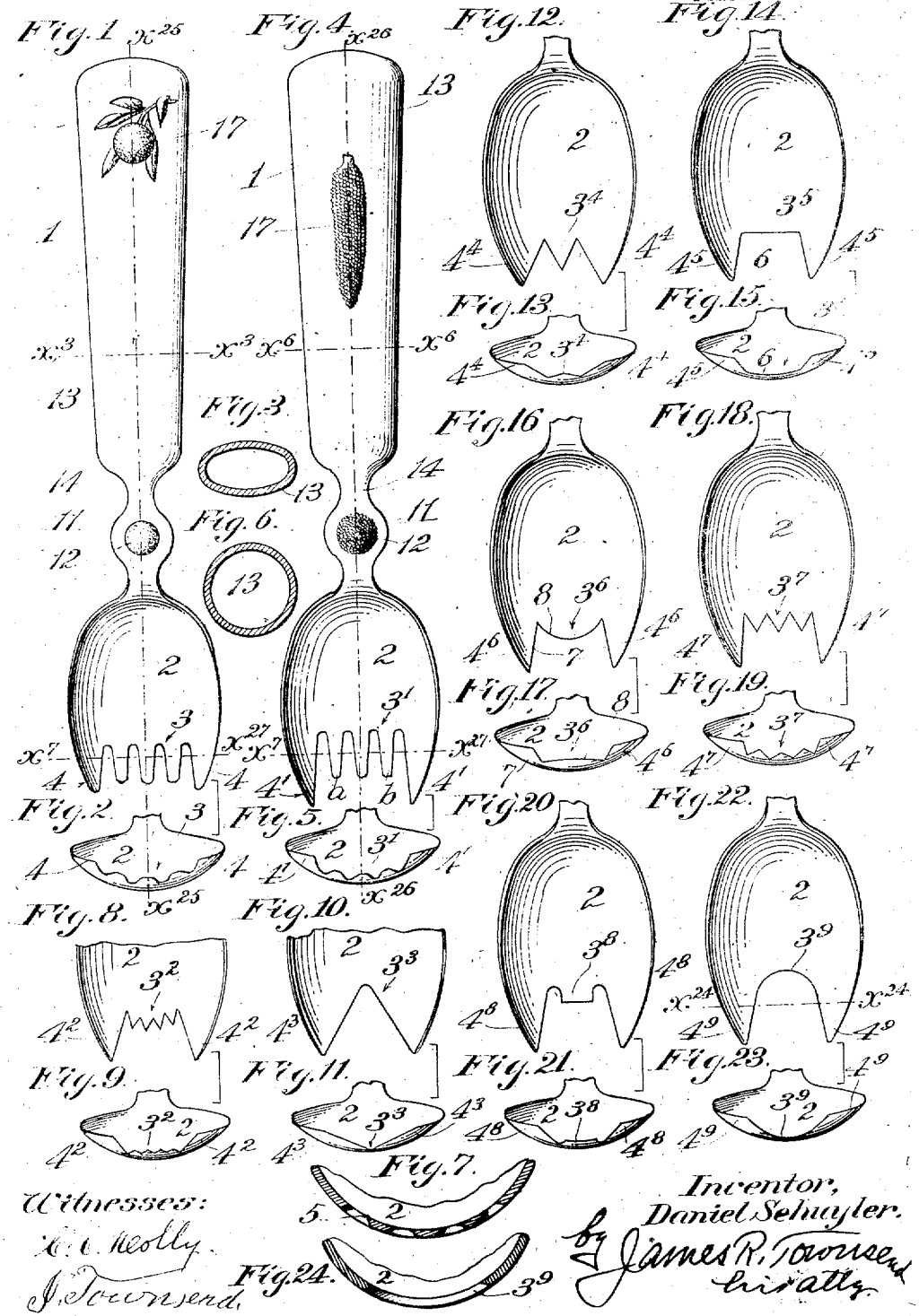

2 SHEETS—SHEET 2.

Witnesses:
C. C. Kelly
J. Townsend

Inventor:
Daniel Schuyler.
by James R. Townsend
his atty.

UNITED STATES PATENT OFFICE.

DANIEL SCHUYLER, OF SAN DIEGO, CALIFORNIA, ASSIGNOR TO PROGRESSIVE BUSINESS CO., OF SAN DIEGO, CALIFORNIA, A CORPORATION OF CALIFORNIA.

CORN AND FRUIT SPOON.

No. 868,583.   Specification of Letters Patent.   Patented Oct. 15, 1907.

Application filed August 24, 1905. Serial No. 275,529.

*To all whom it may concern:*

Be it known that I, DANIEL SCHUYLER, a citizen of the United States, and a resident of the city of San Diego, in the county of San Diego and State of California, temporarily residing at Bridgeport, in the county of Fairfield and State of Connecticut, have invented a new and useful Corn and Fruit Spoon, of which the following is a specification.

This invention relates to table ware.

An object of this invention is to provide an article of table-ware by means of which green corn cooked in the ear can be eaten with convenience, comfort, ease and neatness.

An object in view is to remove the kernels entire from their sockets without mingling the food portion of the corn with portions of the cob, as is usually the case where a sharp knife is used for removing the kernels from the cob. By means of this spoon the loss of the nutritious germs which are often left on the cob when the corn is eaten either by the teeth or cut from the cob with a knife, is avoided.

Another object of the invention is to provide superior means for eating melons and fruit, as oranges and grape fruit or pomelos, in which the pulp is liable to deflect the point of an ordinary spoon; an advantage attained by this invention being certain guiding of the spoon and ready detaching and gathering of tissues of the pulp for conveying the same to the mouth with ease, convenience and neatness, without spilling any of the juice or pulp, or getting any of the fruit on one's hands.

The invention comprises a spoon having a truncated bowl terminating in side guides or guards formed of extensions of the rim of such bowl, and an intermediate food-detaching portion which is below the level of said rim, so that the food which is detached in using the spoon will be guided into the bowl which lies rearwardly from the food-detaching portion of the spoon.

The spoon may be variously constructed, and where the spoon is designed exclusively for use as a corn spoon, the intermediate fruit-detaching portion will preferably consist of tines or teeth which are somewhat blunt; while with spoons designed exclusively for use in eating oranges, pomelos, or other fruit having more or less tough tissues, the food-detaching portion may be provided with sharpened edges for severing the tissues.

The accompanying drawings illustrate the invention in some of the forms in which it may be embodied.

Figure 25:
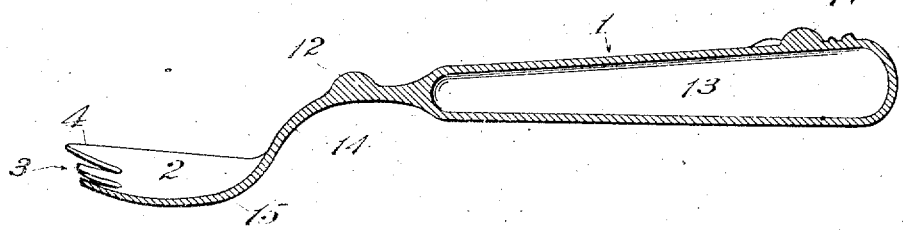
Figure 26:
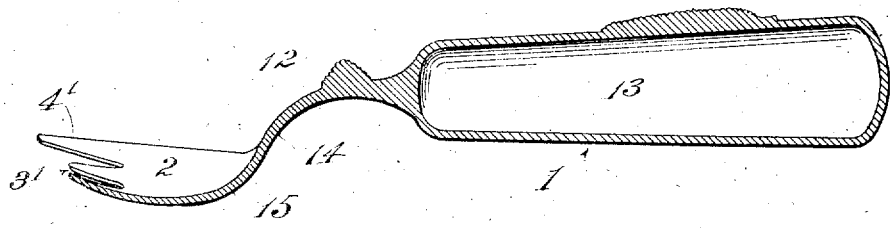
Figure 27:
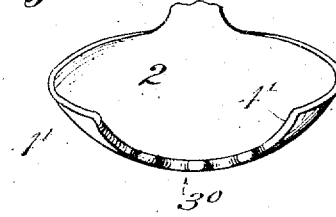
Figure 28:
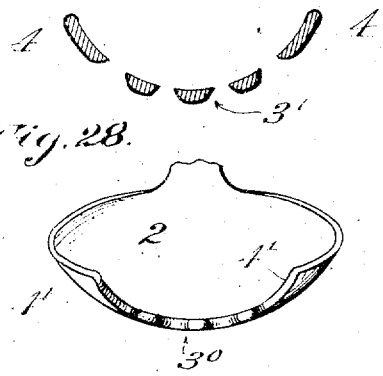

Figure 1 is a view of a spoon embodying this invention, in one form adapted for eating melons and oranges or other fruits, and also for eating corn. Fig. 2 is an end view of the spoon shown in Fig. 1, the handle being broken away to contract the view. Fig. 3 is a section of the handle on line $x^3$—$x^3$, Fig. 1. Fig. 4 is a view of the invention as applied in a corn spoon. Fig. 5 is an end view of the spoon shown in Fig. 4, the handle being omitted and the teeth or tines being blunt. Fig. 6 is a section of the handle on line $x^6$—$x^6$, Fig. 4. Fig. 7 is an enlarged fragmental section on line indicated by $x^7$—$x^{27}$, Figs. 1 and 4. Figs. 8 and 9 are respectively fragmental plan and front end views of another form of the spoon embodying the invention. Figs. 10 and 11, 12 and 13, 14 and 15, 16 and 17, 18 and 19, 20 and 21, 22 and 23, are respectively fragmental plan and front end views of other forms of spoons embodying this invention. Fig. 24 is a section on line $x^{24}$—$x^{24}$, Fig. 22. Fig. 25 is a longitudinal section on line $x^{25}$—$x^{25}$, Figs. 1 and 2. Fig. 26 is a longitudinal section on line $x^{26}$—$x^{26}$, Figs. 4 and 5. Fig. 27 is a section on line $x^7$—$x^{27}$, looking toward the tip of the spoon in Figs. 1 and 4. Fig. 28 is an enlarged elevation showing the ends of the tines and guards shown in Figs. 4 and 5, to show that the ends of said tines and guards will be preferably rounded and smooth, there being no sharp edges which might cut the fingers, the sharp edges of the food-detaching portion being guarded.

The spoon comprises a handle 1, a truncated bowl 2 thereon open at the front and provided at said open front with a food-detaching portion 3 and with guards or guides 4 which are preferably at a level above the intermediate food detaching portion 3, and formed of forward extensions of the rim of the bowl, as may be clearly seen from Figs. 1, 2, and 25, which are different views of the first form of spoon shown in the drawings; although for general purposes the form shown in Fig. 4 is deemed preferable, the intermediate tines or teeth which form the food-detaching portion of said spoon being either blunt or having sharp edges, depending upon the purpose for which it is more particularly designed.

For convenience of description, the intermediate food-detaching portions of the several views are indicated by the character 3 with an exponent, and the guards or guides of the several forms are indicated by the character 4 and an exponent, excepting that in Fig. 1 the exponent is omitted. In the form shown in said Fig. 1 the intermediate food-detaching portion 3 is approximately in the arc of a circle when viewed from the front of the spoon as seen in Fig. 2, in a plane in which the guards and guides 4 terminate, the ends of said guards and guides being above the level of the ends of the intermediate tines. The tines may be blunt, as indicated in Fig. 2, or they may be sharpened at their edges, as indicated at 5 in Fig. 7, the sharp edges extending along the inside of the guards or guides 4.

In the form shown in Figs. 4 and 5 the truncated bowl of the spoon terminates at its forward end inside guards or guides 4¹ and the food-detaching portion 3¹ is intermediate said guides and below the level thereof.

In Figs. 1, 2, 25, 4 and 5 the tips of the tines or teeth 3¹ terminate in a plane rearward from the plane in which the guards or guides 4¹ terminate.

In Figs. 8 and 9 the intermediate fruit-severing portion 3² is in the form of short teeth terminating rearwardly from the tips of the guards or guides 4² and arranged in the arc of a circle.

In Figs. 10 and 11 the intermediate portion 3³ is in the form of a V-shaped opening extending backward from the tips 4³ of the rims of the bowl, which tips form the guards and guides of this form of spoon.

In Figs. 12 and 13 the food-severing portion 3⁴ is in the form of an M-shaped edge between the guards or guides 4⁴.

In Figs. 14 and 15 the food-severing portion 3⁵ is in the form of a three-sided edge nearly rectangular in form, the guards or guides 4⁵ being formed at the sides thereof. It will be seen from Fig. 15 that the rearmost edge 6 of said intermediate portion is curved when viewed in front elevation, although the portion 6 of the edge extends in a plane that is at right angles to the axis of the spoon, as shown in Fig. 14.

In Figs. 16 and 17 the food-detaching portion 3⁶ extends forwardly in a curve at the middle, and the margins 7 of said portion converge from the tips of the guards or guides 4⁶ to the curved edge 8.

In Figs. 18 and 19 the intermediate portion 3⁷ is formed of teeth arranged in line at right angles to the axis of the spoon, and the guards or guides 4⁷ project beyond such line.

In Figs. 20 and 21 the food-detaching portion is in the form of an intermediate square-ended tooth 3⁸ between the guards and guides 4⁸.

In Figs. 22 and 23 the intermediate food-detaching portion is in the form of a U-shaped edge 3⁹ between forwardly-projecting guards 4⁹.

In Fig. 24 it is seen that the edge 3⁹ may be beveled from the underside to the upper side so as to form a sharp cutting portion. When thus formed the spoon is more especially designed for eating melons, oranges, and the like.

In Fig. 28 the food-detaching portion 30 is shown rounded and smooth, there being no sharp edge, thus more particularly adapting the spoon for removing the kernels of corn whole.

It is to be understood that in all of the forms, exposed sharp edges are preferably avoided where it is possible, and that where the spoon is designed for a corn spoon exclusively the edge will be slightly rounded and no sharp surfaces whatever will be used. In all the forms the rim of the bowl is above the level of any of the intermediate food-detaching portion and serves as a guide or side rail to guide the spoon and to gather into the bowl the corn or pulp as it is made loose, excavated, lifted up and pressed back into the bowl 2 by a forward movement of the latter.

It will be seen that by using a truncated bowl the same is adapted to conform to the inner face of the rind of an orange or other globular fruit, and in eating such fruit the pulp may readily be disengaged and taken up by the bowl, and the juices of the fruit will also be taken up and held by the bowl. For corn, preferably the intermediate tines are three in number, as shown in Fig. 4, the space between the two guards or outer tines or teeth, 4¹, 4¹, being somewhat wider than the width of two average rows of corn kernels, so that the middle tine will pass along between the two rows and the next to the outer tines, (a, b), will sever or dig out the kernels from their sockets.

The bowl 2 is of considerable depth and of sufficient capacity to hold a mouthful of the removed kernels, or of the pulp in the case of eating fruit. The outer guards or guides 4, 4¹, etc., serve to cause the corn to roll into the bowl without loss of any of the kernels.

The handle 1 is preferably of considerable width, length and thickness, so as to afford a firm grip for the hand, and is also provided with shoulders 11 near the bowl at the front end of the handle to form one or more stops for the fingers of the user. An additional shoulder or boss 12 may be formed projecting up from the face of the handle between the main body of the handle and the bowl 2. The handle preferably comprises the main broad body 13 connected with the bowl by a short, narrow neck 14 which may be broadened to give room for the shoulder or boss 12, which for the corn spoon may be in the form to represent the tip of an ear of corn, and for an orange spoon, may be in the form of half an orange.

The bowl 2 terminates in a fulcrum portion 15 at the heel of the bowl, and the handle is connected with said heel by a short neck 14 upwardly bent from said fulcrum portion. The handle may also be provided with a boss 17 at the end opposite the bowl to afford a firmer grip for the hand so that the utensil can be firmly held in the hand while removing the kernels from the cob.

The bosses 12 and 17 may be of any appropriate or namental or other shape. They are preferably made to represent end and side elevations, respectively, of an ear of corn, or may represent an orange in bas-relief.

In practice, for eating corn, the user may grasp the handle with one hand, placing the finger against one of the stops 11 or 12, and then holding the ear of corn firmly on the plate, will run the tines or teeth along the rows of kernels, allowing them to fill the bowl 2 of the spoon by which they may be conveyed to the mouth. In some instances, the user may pry with the spoon, using the heel thereof as a fulcrum, thus lifting the kernels out of their sockets.

When the spoon is used for eating oranges or other fruit, the guards and guides 4, 4¹, etc., assist in giving certain direction to the course of the spoon, and the portion of the front margin of the bowl intermediate said guards and guides conforms practically to the inside of the orange rind and detaches the pulp in front of the bowl and below the level of the guards and guides and the bowl-rim, and thereupon the bowl receives the detached pulp and the juices to convey the same to the mouth.

It is to be noted finally that in all of the various forms shown in Figs. 1 to 28 inclusive, this novel spoon comprises a truncated concave bowl, the body portion and the rear end of which form a single concavity closed at the heel and open at front and top from heel forward, said bowl being truncated at the front end; that said spoon has a handle on the rear concave portion of said bowl, and is provided with guides or guards which are at a common level and form forward extensions of the rim of the bowl; and that said spoon also comprises a food-detaching edge portion integral with said bowl and guides or guards and forming, together with said guides or guards, the forward end of said truncated bowl, said food-detaching edge portion being between said guides and below the level of said rim and the tops of said guides for the purpose of detaching such edible portions of fruit or vegetables as may, on a forward movement of the spoon, be brought between the guards or guides, thereby to cause such edible portions to be gathered into the bowl of the spoon and conveyed to the mouth without liability of spilling.

What I claim is:—

1. A spoon comprising a truncated concave bowl, the body portion and rear end of which form a single concavity, said bowl being truncated at the front end; a handle on the rear concave portion of said bowl, guides or guards which are at a level and form forward extensions of the rim of the bowl; and a food-detaching edge portion forming, together with said guides or guards, the forward end of said truncated bowl, said food-detaching edge portion being between said guides and below the level of said rim and the tops of said guides for the purpose of detaching such edible portions of fruit or vegetables as may, on a forward movement of the spoon, be brought between the guards or guides, thereby to cause such edible portions to be gathered into the bowl of the spoon and conveyed to the mouth without liability of spilling.

2. A spoon comprising a handle, a bowl thereon open at the front end and terminating in a plurality of teeth or tines, the outer ones of which project forward beyond the intermediate ones.

In testimony whereof, I have hereunto set my hand at Bridgeport, Connecticut this 22" day of August 1905.

DANIEL SCHUYLER.

In presence of—
MINNIE E. W. HULL,
ELBERT O. HULL.